Figure 1:
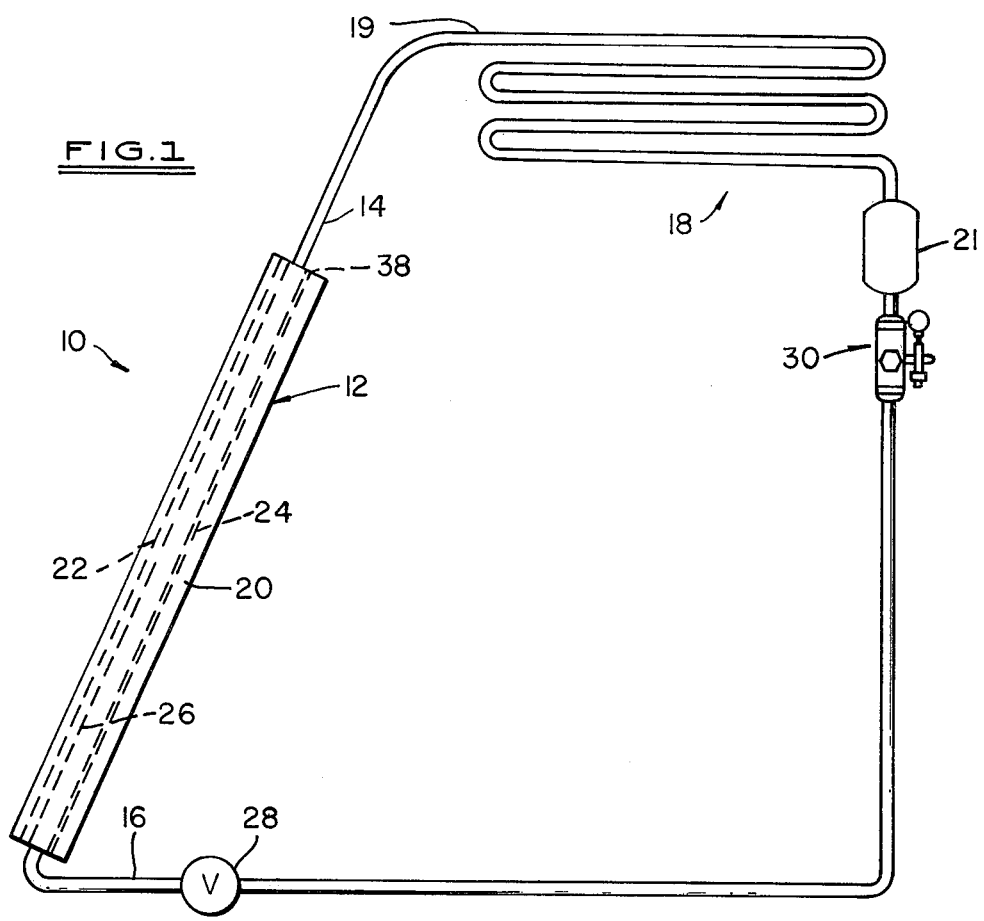

United States Patent [19]

Bottum

[11] 4,203,422
[45] May 20, 1980

[54] SOLAR HEATING SYSTEM AND COMPONENT

[76] Inventor: Edward W. Bottum, 9357 Spencer Rd., Brighton, Mich. 48116

[21] Appl. No.: 876,022

[22] Filed: Feb. 8, 1978

[51] Int. Cl.² ............................................. F24J 3/02
[52] U.S. Cl. .................................................. 126/417
[58] Field of Search ............... 126/270, 271; 237/1 A; 62/2; 138/30, 31; 137/468

[56] References Cited

U.S. PATENT DOCUMENTS

| | | | |
|---|---|---|---|
| 1,950,107 | 3/1934 | Guinn et al. | 138/30 |
| 2,743,872 | 5/1956 | Wood et al. | 236/42 X |
| 3,152,442 | 10/1974 | Rowekamp | 126/271 X |
| 4,007,776 | 2/1977 | Alkasab | 237/1 A |
| 4,120,289 | 10/1978 | Bottum | 126/271 |
| 4,148,293 | 4/1979 | Lents et al. | 126/271 |

Primary Examiner—James C. Yeung
Assistant Examiner—Larry Jones
Attorney, Agent, or Firm—Whittemore, Hulbert & Belknap

[57] ABSTRACT

A solar system heating component is provided for use in a solar heating system. The heating system comprises a solar collector structure operatively connected to a heat-dissipating structure for using the heat energy which the system produces. Refrigerant is used in the system. The refrigerant is boiled in the collector and condensed in the heat dissipating structure. The solar heating system component is located downstream from the heat dissipating structure and prevents flow of liquid refrigerant back to the collector structure when the temperature in the system rises to a predetermined level. The component also includes other structure including a sight glass, servicing structure and means for mounting auxilliary components.

8 Claims, 2 Drawing Figures

U.S. Patent

May 20, 1980

4,203,422

SOLAR HEATING SYSTEM AND COMPONENT

BACKGROUND OF THE INVENTION

Solar heating systems in the past have been completely filled with a collector fluid, except for a small expansion volume in the surge tank.

The present solar system departs from past practice in one aspect in that a refrigerant, such as the fluorinated hydrocarbons, is used as the collector fluid. Only the collector is filled with liquid refrigerant, the balance of the system containing refrigerant gas according to the pressure-temperature relationship of the refrigerant. Normally, there are no pressure reducing valves or pressure regulating valves used in the system. The entire system being basically under the same pressure, such control devices may be dispensed with. However, this is not to exclude the use of such structures under certain conditions. The pressure will be determined by the condensing temperature in the heat dissipator.

In past practice, sensible heat of the collector fluid is raised in the collector as heat is picked up. The collector fluid is then circulated by a pump (using some energy) to a heat exchanger or heat dissipating or storage device.

In the present invention, latent heat of the refrigerant is picked up causing the liquid refrigerant to "boil" and change to vapor according to the amount of heat picked up. Vapor pressure immediately travels to the heat dissipating device where it condenses and returns as a liquid to the collector, this being a continuous procedure as long as heat is being absorbed by the collector.

Now, since latent heat is being used for heat movement instead of sensible heat, if the load at the heat dissipator is equal to the heat input at the collector, the pressure in the system will remain constant and not increase. Therefore, the collector plate temperature can remain lower than in old style systems where sensible heat is picked up. Since the Delta T in the collector is greater, the efficiency of a collector can be much greater than for old style collector fluid charged systems.

Also, the response to sudden bursts of sunlight is almost instantaneous in a refrigerant charged system and it will be picking up and transferring usable heat before the old style collector fluid charged system can get started.

Whenever the heat dissipator is located above the collector, a circulating pump can usually be eliminated. When desired to locate the heat dissipator below or near the same height as heat pick up, a small refrigerant circulating pump is used. However, since latent heat of the refrigerant is used instead of sensible heat, a relatively small weight of refrigerant needs to be circulated and very little power is required.

A refrigerant charged system is very useful in picking up an abundance of "low-grade" heat for use in heat pumps. Heat may be transferred from the ground or storage tanks or phase change materials for use in heat pumps with the expenditure of very little or no energy.

Obviously, this system may be used for picking up heat and moving it inside to a radiator, or fan coil, or heat dissipating plate, or water heater, or heat exchanger primary, or for storage in water, masonry, phase change materials and the like.

The present invention comprises a component for such a system which will control flow of refrigerant in the system to allow flow only as such times when the temperature, and consequently the pressure, of the refrigerant is low enough so that the system may be operated safely. The component is located in the liquid refrigerant return line between the heat dissipating structure and the collector structure. A thermostatically controlled valve is provided in the component. This valve closes at a predetermined temperature causing a stoppage of flow of liquid refrigerant back to the collector structure from the heat dissipating structure. This results in all refrigerant being condensed into the heat dissipating structure whereupon the system becomes inoperative. Therefore, the maximum system temperature is regulated without external means or controls or external wiring.

The component provides additional structure including a convenient valve evaluating, charging and servicing for the system and provides a connection for a permanent pressure gauge if desired. The component is useful in installing, servicing, checking as to the amount of charge and controlling the maximum system temperature and pressure.

SUMMARY OF THE INVENTION

A closed solar heating system is provided. The system includes a solar collector structure, heat dissipating structure and means for circulating a refrigerant heat transfer medium in gaseous form from the collector structure to the heat dissipating structure and in liquid form from the heat dissipating structure to the collector structure. All of these components are connected together in operative relationship. The system is charged with a refrigerant heat transfer medium. The heat dissipating structure has a sufficient volume capacity to store all of the heat transfer medium in the system when such medium is in liquid form. A thermostatically operated valve is provided in the means for circulating a refrigerant heat transfer medium in liquid form from the heat dissipating structure to the collector structure. The thermostatically operated valve is open to permit flow of liquid refrigerant therethrough when the temperature thereof is below a predetermined level. The thermostatically operated valve closed when the temperature of the liquid refrigerant passing therethrough is above the predetermined level.

IN THE DRAWING

Figure 2:
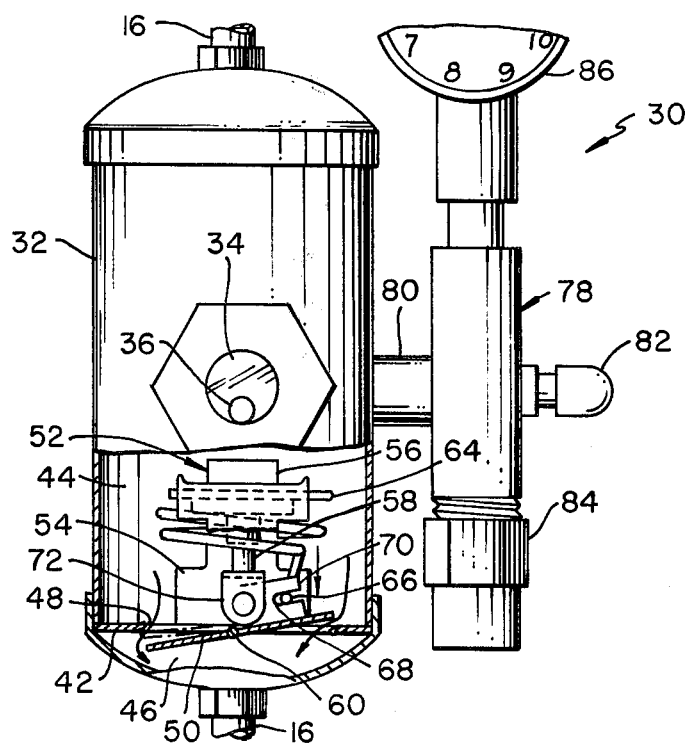

FIG. 1 is a diagramatic view in elevation of one embodiment of a solar heating system including the component of the present invention; and FIG. 2 is a elevational view of the component for the FIG. 1 system.

Referring to FIG. 1, the solar energy system 10 comprises a solar collector 12 which includes an internal tubular structure. The inlet and outlet of the collector 12 are connected to, respectively, conduits 14, 16. A heat dissipating structure 18, which includes a coil 19 and a receiver 21 connected to the outlet thereof, is provided above the collector 12. The coil 19 may be used to dissipate heat in any desired way, as by use of fans, immersion in water, soil or other media and the like. The conduits 14, 16 are connected to the coil 19.

Alternately to coil 19 and receiver 21, a vessel may be connected to the outlet of collector 12 and serve as a condenser. The vessel may surround a coil through which a heat transfer medium flows.

In the present invention, standard refrigerant fluid suitable for use in refrigeration, normally fluorinated hydrocarbons, is used as the heat exchange medium in the system. The refrigerant changes from a liquid to a gas in the collector 12. In essence, the refrigerant boils. Thus, it is the latent heat causing evaporation, not sensible heat, which is absorbed by the refrigerant in the collector 12. As there is no great change in temperature upon evaporation, the collector will run cooler than conventional systems. Also, less amounts of fluid need be pumped, when pumping is necessary, thereby reducing pump size and energy use thereof, because more heat is absorbed in a small volume of medium.

When the evaporated refrigerant circulates through the coil 19, it condenses into a liquid. In so doing, it gives off the latent heat as desired.

The collector 12 is of the type wherein the coils are essentially flooded with liquid refrigerant leaving only a small space at the upper portion to receive gaseous refrigerant which boils off from the liquid refrigerant. The collector is of generally conventional construction. It comprises a casing 20 having a transparent plate 22 through which the sun's rays pass. Inside the casing 20 and behind the plate 22 is a metal plate 24, normally blackened to result in maximum absorption of sun rays.

A tubular structure 26 is secured on the face of metal plate 24 and heat transfer relation thereto. The tubular structure 26 preferably comprises a plurallity of parallel tubes connected at each end by a tubular manifold. Conduit 16 is connected to the inlet of the tubular structure and conduit 14 is connected to the outlet of the tubular structure.

As will be appreciated, when collector 12 is positioned as in FIG. 1, liquid refrigerant floods a major portion of the tubular structure while gaseous refrigerant may boil off the top thereof and into conduit 14. A thin, flat vessel could be used instead of a tubular structure 26. On the other hand, a sinuous tubular structure would be undesirable because the gaseous refrigerant would have to move through liquid refrigerant. As will be appreciated, several collectors 12 may be connected together in a bank.

An off-on valve 28 is provided between the outlet of coil 19 and the inlet of collector 12. The valve 28 is preferably solenoid operated to permit electrical control thereof. The valve 28 may be closed at times when it is desired to control heat transfer. Refrigerant which vaporizes in the collector flows through the coil 19 and is condensed to a liquid. The liquid cannot flow back to the collector 12 when valve 28 is closed. Coil 19 and receiver 21 have sufficient capacity to hold all of the liquid charge. When collector 12 empties, heat transfer ceases.

The component 30 is provided in conduit 16. The component 30, as shown in FIG. 2, includes a small closed vessel 32 having a sight glass 34. A float 36 is provided to illustrate the liquid level in the system. The sight glass 34 should be positioned at the same level as the top 38 of tubular structure 26. Then when the system is charged to the sight glass, the collector will have a proper level of liquid refrigerant.

A thermostatically controlled valve structure is provided within the vessel 32. This structure includes a wall structure 42 located adjacent the lower end of vessel 32. The wall structure 42 extends entirely across the vessel 32 and provides a fluid seal between upper compartment 44 and lower compartment 46 excepting for central valve opening 48. A valve element 50 is pivotally in opening 48. When the valve element 50 is tilted as shown in FIG. 2, liquid refrigerant may pass from upper compartment 44 into lower compartment 46 and then through conduit 16 to flow back to the lower portion of tubular structure 26 in collector 12. However, when valve element 50 is pivoted to be in line with wall structure 42, compartments 44, 46 are effectively sealed from each other and liquid refrigerant will stop flowing. Gaseous refrigerant which subsequently condenses in coil 19 will be trapped in this coil and the receiver 21. As will be recalled, the heat dissipating structure 18 has sufficient capacity to store all of the liquid refrigerant in the system. Thus, as liquid refrigerant continues to boil in collector 12, it will condense in coil 19 and be trapped in coil 19 and receiver 21. Ultimately, all of the liquid refrigerant in collector 12 will boil off and be condensed in the coil 19 and remain in the coil and receiver. The system will then be shut down.

The means for closing or opening valve element 50 include a thermostatic element 52 mounted on a bracket 54. The bracket 54 is mounted on wall structure 42. Element 52 includes a power capsule 56 which contains conventional thermostatically expansionable material. A piston 58 extends from capsule 56 into contact with the upper surface of the valve element 50 off-center from the pivotal mounting 60 thereof. A coil spring 64 has its upper end attached to bracket 54. The lower end 66 extends into slot 68 of element 70 which is secured to the upper surface of the valve element 50. The piston has a bracket 72 at the end thereof and is pivotably mounted to element 74 at 76.

The spring, in its normal relaxed position as shown in FIG. 2, normally pivots the valve element 50 out of alignment with the wall structure 42 as shown in FIG. 2. When the temperature of the return liquid refrigerant reaches a sufficient elevation, piston 58 is forced out of capsule 56 downwardly to cause closure of the valve element into a position in alignment with wall structure 42. This effectively seals the compartments 46, 48 as previously discussed.

In operation of the system, liquid refrigerant is boiled in the collector 12 when the sun rays shine thereon. The gaseous refrigerant passes to the coil 19 as a consequence of its own pressure. It is not pumped by external means. The gaseous refrigerant condenses in coil 19, thus giving off heat. The liquid refrigerant is then returned to collector 12 by means of gravity, it being noted that coil 19 is located above collector 12. If coil 19 is located below collector 12, then a small refrigerant pump is necessary to move the liquid refrigerant.

Should the system temperature raise to a predetermined, undesired level, valve element 50 will close. Liquid refrigerant will then collect in coil 19 and receiver 21 until all of the refrigerant has boiled off collector 12 thus effectively closing the system down.

What I claim as my invention is:

1. A closed solar heating system comprising a solar collector structure, heat dissipating structure, and means for producing the circulation of a refrigerant heat transfer medium in gaseous form from the collector structure to the heat dissipating structure to the collector structure, all connected together in operative relationship, a refrigerant heat transfer medium in the system, said heat dissipating structure having a volume capacity sufficient to store all of the refrigerant heat transfer medium in the system when said medium is in liquid form, a thermostatically operated valve provided in the means for producing the circulation of a refrigerant heat transfer medium in liquid form from the heat dissipating structure to the collector structure, said thermostatically operated valve including means to normally hold the valve in the open position when the temperature of the liquid refrigerant passing therethrough is below a predetermined level, said thermostatically operated valve including means responsive to temperature to cause closing of the valve when the temperature of the liquid refrigerant passing therethrough rises above the predetermined level, said solar collector being located to receive sun rays, said heat dissipating structure being effective to transfer heat to a heat receiving medium during periods of sunlight.

2. A closed solar heating system as in claim 1, further characterized in that the refrigerant heat transfer medium is a fluorinated hydrocarbon.

3. A closed solar heating system as in claim 1, further characterized in the provision of an on-off valve in the means for circulating the liquid heat transfer medium between the heat dissipating structure and the collector structure.

4. A closed solar heating system as in claim 1, further characterized in the provision of a closed vessel in the means for circulating the liquid heat transfer medium between the heat dissipating structure and the collector structure, wall structure within said closed vessel dividing the vessel into two compartments, said thermostatically operated valve being mounted on said wall structure, said wall structure including a valve opening, said thermostatically operated valve including a valve element being movable to a position out of alignment with said wall structure to permit liquid refrigerant to flow through said opening, said valve structure being movable to a position in alignment with said wall structure to prevent movement of liquid refrigerant through said opening.

5. A closed solar heating system as in claim 4, further characterized in the provision of a sight glass and float elements on said vessel, said sight glass being located in substantial alignment with the upper portion of said collector structure so as to permit observation of the level of liquid refrigerant in the upper portion of said collector structure.

6. A closed solar heating system as in claim 5, further characterized in the provision of additional valve structure on said vessel, said additional valve structure permitting charging or evacuating the solar heating system with refrigerant heat transfer medium.

7. A closed solar heating system as in claim 6, further characterized in that the additional valve structure includes means for mounting a pressure gauge.

8. A closed solar heating system as in claim 7, further characterized in that the additional valve structure includes means for opening the interior of said vessel to either the means for mounting a pressure gauge or the means for evacuating or charging the system.

* * * * *